United States Patent
Abe et al.

(10) Patent No.: US 7,262,485 B2
(45) Date of Patent: Aug. 28, 2007

(54) SUBSTRATE FOR GROWING ELECTRO-OPTICAL SINGLE CRYSTAL THIN FILM AND METHOD OF MANUFACTURING THE SAME

(75) Inventors: Yoshihisa Abe, Hadano (JP); Shunichi Suzuki, Hadano (JP); Hideo Nakanishi, Hadano (JP); Jun Komiyama, Hadano (JP)

(73) Assignee: Covalent Materials Corporation, Tokyo (JP)

( * ) Notice: Subject to any disclaimer, the term of this patent is extended or adjusted under 35 U.S.C. 154(b) by 1 day.

(21) Appl. No.: 11/174,610

(22) Filed: Jul. 6, 2005

(65) Prior Publication Data

US 2006/0011941 A1 Jan. 19, 2006

(30) Foreign Application Priority Data

Jul. 13, 2004 (JP) .............................. 2004-206150

(51) Int. Cl.
*H01L 29/30* (2006.01)
*H01L 29/04* (2006.01)
*H01L 31/036* (2006.01)

(52) U.S. Cl. ................. 257/617; 257/628; 257/E21.125
(58) Field of Classification Search ................ 257/617, 257/628, E21.125
See application file for complete search history.

(56) References Cited

U.S. PATENT DOCUMENTS

| | | | |
|---|---|---|---|
| 6,605,151 B1* | 8/2003 | Wessels et al. ............. | 117/103 |
| 6,800,133 B1* | 10/2004 | Kim et al. .................... | 117/89 |
| 2002/0179935 A1* | 12/2002 | Irwin ........................ | 257/200 |
| 2002/0197489 A1* | 12/2002 | Lee et al. ................... | 428/446 |
| 2003/0015729 A1* | 1/2003 | Bosco et al. ................ | 257/190 |
| 2003/0020089 A1* | 1/2003 | Yu et al. ..................... | 257/142 |
| 2003/0022431 A1* | 1/2003 | Yu et al. ..................... | 438/234 |
| 2003/0160176 A1* | 8/2003 | Vispute et al. ............. | 250/372 |
| 2004/0079285 A1* | 4/2004 | Li et al. ..................... | 118/715 |
| 2004/0164315 A1* | 8/2004 | Demkov ..................... | 257/107 |
| 2004/0262631 A1* | 12/2004 | Fitzgerald ................... | 257/191 |
| 2005/0037556 A1* | 2/2005 | Grutzmacher ............... | 438/197 |
| 2006/0011925 A1* | 1/2006 | Bader et al. ................. | 257/78 |

(Continued)

FOREIGN PATENT DOCUMENTS

JP 01-152770 A 6/1989

OTHER PUBLICATIONS

C.H. Lei et al.; "Microstructure and Orientation Relations of BaTiO_3/MgO/YSZ Multilayers Deposited on Si(0 0 1) Substrates by Laser Ablation", Journal of Crystal Growth, vol. 24, pp. 137-144, 1997.

(Continued)

*Primary Examiner*—Ngân V. Ngô
(74) *Attorney, Agent, or Firm*—Foley & Lardner LLP

(57) ABSTRACT

A substrate 1 for growing an electro-optical single crystal thin film in which two or more layers of buffer layers 3, 4, and 5 for buffering lattice mismatch between Si and BTO are formed on an Si (001) substrate 2 is provided as a substrate for growing an electro-optical single crystal thin film which can obtain an electro-optical single crystal thin film of BTO single crystal thin film 6 etc. with a large size and a very high quality.

7 Claims, 4 Drawing Sheets

U.S. PATENT DOCUMENTS

2006/0121695 A1* 6/2006 Ueda et al. .................. 438/458
2006/0138508 A1* 6/2006 Shimizu et al. ............. 257/295
2006/0157685 A1* 7/2006 Ponomarev .................. 257/14
2006/0169987 A1* 8/2006 Miura et al. .................. 257/79
2006/0208257 A1* 9/2006 Branz et al. .................. 257/49

OTHER PUBLICATIONS

Sangsab Kim, "Preparation and Characterization of $BaTiO_3$ Thin Films on MgO- Buffered Si(100) Substrates by RF Sputtering", J. Mater. Res., vol. 12, No. 4, Apr. 1997, pp. 1152-1159.

* cited by examiner

SUBSTRATE FOR GROWING ELECTRO-OPTICAL SINGLE CRYSTAL THIN FILM AND METHOD OF MANUFACTURING THE SAME

BACKGROUND OF THE INVENTION

1. Field of the Invention

The present invention relates to a substrate used for epitaxially growing an electro-optical single crystal thin film made of $BaTiO_3$ (BTO: barium titanate), $PbTiO_3$, $BiKTiO_3$ etc., used for an optical switch, an optical modulator, etc., and a method of manufacturing the same.

2. Description of the Related Art

A BTO single crystal is a transparent crystal made of Ba (barium), Ti (titanium), and O (oxygen), and is known as a material that provides a very large secondary electro-optical effect (Kerr effect) which determines an efficiency of an optical device.

As for the above-mentioned BTO single crystal, it is known that a BTO single crystal thin film is formed on an Si (001) (silicon, (001) face) substrate via an MgO (magnesium oxide) single crystal layer as a buffer layer for buffering lattice mismatch between Si and BTO (see J. Mater. Res., Vol.12, No.4, pp 1152-1159, April 1997).

However, in the above-mentioned BTO single crystal, the lattice mismatch between Si and BTO is not fully relieved, so that BTO is polycrystallized, making it difficult to manufacture the optical device.

SUMMARY OF THE INVENTION

The present invention aims to provide a substrate for growing an electro-optical single crystal thin film which is large in size and capable of obtaining an electro-optical single crystal thin film of a very high quality, and a method of manufacturing the same.

The substrate for growing the electro-optical single crystal thin film in accordance with the present invention is a substrate for epitaxially growing an electro-optical single crystal thin film, and is characterized by forming two or more layers of buffer layers which buffer the lattice mismatch between Si and the electro-optical single crystal thin film on an Si (001) substrate.

Preferably the above-mentioned buffer layer is constituted by an $SrTiO_3$ (STO) single-crystal layer and a $BaTiO_3$ (BTO) single-crystal layer which are formed in order on the Si (001) substrate, except that the electro-optical single crystal thin film is BTO.

More preferably a mixed crystal layer of STO and BTO is interposed between the above-mentioned STO single crystal layer and BTO single crystal layer.

Or alternatively the above-mentioned buffer layer is preferably constituted by an STO single crystal layer and a mixed crystal layer of STO and BTO, which are formed in order on the Si (001) substrate.

Moreover, the above-mentioned buffer layer may be constituted by a 3C—SiC single crystal layer and an MgO single crystal layer which are formed in order on the Si (001) substrate.

Further, in this case the electro-optical single crystal thin film is preferably BTO.

Moreover, the method of manufacturing the substrate for growing the electro-optical single crystal thin film in accordance with the present invention is a method of manufacturing the substrate for epitaxially growing the electro-optical single crystal thin film, wherein two or more layers of buffer layers which buffer the lattice mismatch between Si and the electro-optical single crystal thin film on the Si (001) substrate are stacked in order by way of epitaxial growth.

It is preferable that the above-mentioned buffer layer is constituted by an STO single crystal layer and a BTO single crystal layer which are stacked in order on the Si (001) substrate by way epitaxial growth, except that the electro-optical single crystal thin film is BTO.

In addition, more preferably a mixed crystal layer of STO and BTO is stacked on the STO single crystal layer by way of epitaxial growth before epitaxially growing the above-mentioned BTO single crystal layer.

Or alternatively the above-mentioned buffer layer is preferably constituted by a STO single crystal layer and a mixed crystal layer of STO and BTO, which are stacked in order on the Si (001) substrate by way of epitaxial growth.

Moreover, the above-mentioned buffer layer may be constituted by a 3C—SiC single crystal layer and an MgO single crystal layer, which are stacked in order on the Si (001) substrate, by way of epitaxial growth.

DESCRIPTION OF THE PREFERRED EMBODIMENTS

Figure 1:
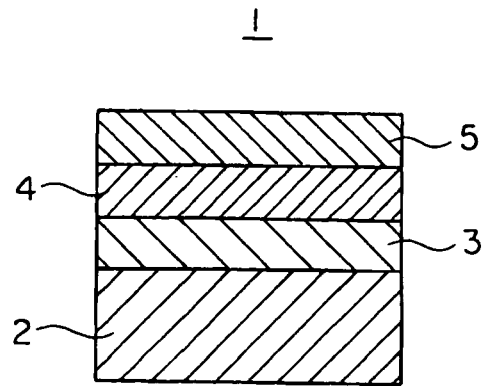
FIG. 1 is a conceptual cross section showing example 1 of a substrate for growing an electro-optical single crystal thin film in accordance with the present invention.

In a substrate for growing an electro-optical single crystal thin film of the present invention, two or more layers of buffer layers are formed which buffer lattice mismatch between Si and the electro-optical single crystal thin film on an Si (001) substrate.

Since BTO etc. may each be cubic and tetragonal as a crystalline form, Si may be cubic. Thus, it is preferable for the above-mentioned buffer layer to choose a crystal of cubic or tetragonal system.

Preferably the above-mentioned buffer layer is constituted by the STO single crystal layer and BTO single crystal layer which are formed in order on the Si (001) substrate.

A thickness of this STO single crystal layer is preferably 2-100 nm.

If the thickness of the above-mentioned STO single crystal layer is less than 2 nm, a crystal film to be further stacked may be influenced by its substrate, a crystal whose crystal orientation rotates in the plane not only by 45 degrees but also by 90 degrees may occur, which may result in a polycrystalline. On the other hand, although it may exceed 100 nm, there is no specific change in crystallinity.

In addition, STO that is cubic grows in the direction in which it rotates in the plane by 45 degrees with respect to Si, if the epitaxial growth of STO is carried out on Si, because its lattice constant is 0.3905 nm which is close to 0.384 nm, a 1×1 unit cell length of Si.

Further, the thickness of the above-mentioned BTO single crystal layer is preferably 5-15 nm.

If the thickness of the above-mentioned BTO single crystal layer is less than 5 nm, it remains unchanged at the lattice constant of STO. On the other hand, if the thickness exceeds 15 nm, it is closer to the lattice constant of BTO itself, then a large lattice distortion arises and a crystal defect occurs.

For example, when it is used as a substrate of a cubic single crystal thin film, BTO should have a film thickness of 5-15 nm and form a super-lattice structure with STO.

However, when using BTO as an active layer, it is not limited to the above. Thus, it is possible to obtain a required film thickness after preparing the super-lattice structure with STO.

Further, more preferably the mixed crystal layer of STO and BTO is interposed between the above-mentioned STO single crystal layer and the BTO single crystal layer.

The thickness of this mixed crystal layer of STO and BTO is preferably 100-1000 nm.

If the above-mentioned thickness of the mixed crystal layer of STO and a BTO is less than 100 nm, inclination of the lattice constant increases, thus causing a lattice defect. On the other hand, if the thickness exceeds 1000 nm, a wafer warps considerably.

Preferably the lattice constant of the above-mentioned mixed crystal layer of STO and BTO is varied to be close to that of the STO single crystal layer on the STO single crystal layer side and to be close to that of the BTO single crystal layer on the BTO single crystal layer side.

Further, the above-mentioned buffer layer may be constituted by a 3C—SiC single crystal layer and an MgO single crystal layer which are formed in order on the Si (001) substrate.

Preferably the thickness of this 3C—SiC (cubic silicon carbide) single crystal layer is 5-1000 nm.

If the thickness of the above-mentioned 3C—SiC single crystal layer is less than 5 nm, a crystal film which is further stacked is not a single crystal. On the other hand, if the thickness exceeds 1000 nm, the wafer warps considerably.

In addition, although there is approximately 20% difference in a lattice constant (0.436 nm) of 3C—SiC as compared with the lattice constant (0.543 nm) of Si, 3C—SiC which is cubic can be grown on Si by way of heteroepitaxial growth by carbonizing Si surface.

Further, the thickness of the above-mentioned MgO single crystal is preferably 5-1000 nm.

If the thickness of the above-mentioned MgO single crystal is less than 5 nm, the MgO single crystal is influenced by the lattice constant of SiC, leaving the lattice of MgO in a distorted condition. Thus, the MgO single crystal does not have the lattice constant of the MgO itself. On the other hand, if the thickness exceeds 1000 nm, the wafer warps considerably.

In addition, MgO which is cubic and whose lattice constant (0.421 nm) is close to the lattice constant of 3C—SiC can be grown on 3C—SiC by way of heteroepitaxial growth in a situation where a misfit dislocation is controlled.

Further, MgO has the lattice constant close to that of BTO, and allows the heteroepitaxial growth of BTO thereon.

Examples of the epitaxial growing methods are VPE (vapor phase epitaxial method) which includes CVD method (chemical method) and PVD method (physical method), LPE (liquid phase epitaxial method) which includes a zone melting method, CZ method (Czochralski method), etc., and others.

Hereafter, the present invention will be described more particularly based on examples, however the present invention is not limited to the following examples.

The substrate for growing the electro-optical single crystal thin film in accordance with the present invention can be used for growing not only electro-optical single crystals including BTO, $PbTiO_3$, and $BiKTiO_3$ but also other optical single crystals.

EXAMPLE 1

FIG. 1 illustrates a conceptual cross section of the substrate for growing the electro-optical single crystal thin film in accordance with the present example. This substrate 1 for growing the electro-optical single crystal thin film is for growing a BTO single crystal thin film. An STO single crystal layer 3 with a thickness of approximately 100 nm, a mixed crystal layer 4 of STO and BTO with a thickness of approximately 100 nm, and a BTO single crystal layer 5 with a thickness of approximately 1000 nm are formed, in order on an Si (001) substrate 2, as a buffer layer which buffers lattice mismatch between Si and BTO.

In order to manufacture the above-mentioned substrate 1 for growing the electro-optical single crystal thin film, firstly the Si (001) substrate 2 was provided on an RF (Radio Frequency) sputtering apparatus so as to form the STO single crystal layer 3 as a film on a natural oxide film. Then, the substrate temperature was raised to 800 degrees C., and the STO single crystal layer 3 (see FIG. 2(b)) was grown to a thickness of approximately 100 nm.

A sintering STO target was used as a material (see FIG. 2(a)), and a gaseous mixture of Ar (argon) and $O_2$ was used as a sputtering gas.

Next, similarly the substrate temperature was raised to 800 degrees C., and the mixed crystal layer 4 (see FIG. 2(c)) of STO and BTO was grown to a thickness of approximately 100 nm.

A sintering STO and sintering BTO target was used as the material (see FIG. 2(b)), and the gaseous mixture of Ar and $O_2$ was used as the sputtering gas.

Then, similarly the substrate temperature was held at 800 degrees C., and the single crystal layer 5 (see FIG. 1) of BTO was grown to a thickness of 1000 nm.

Figure 2:
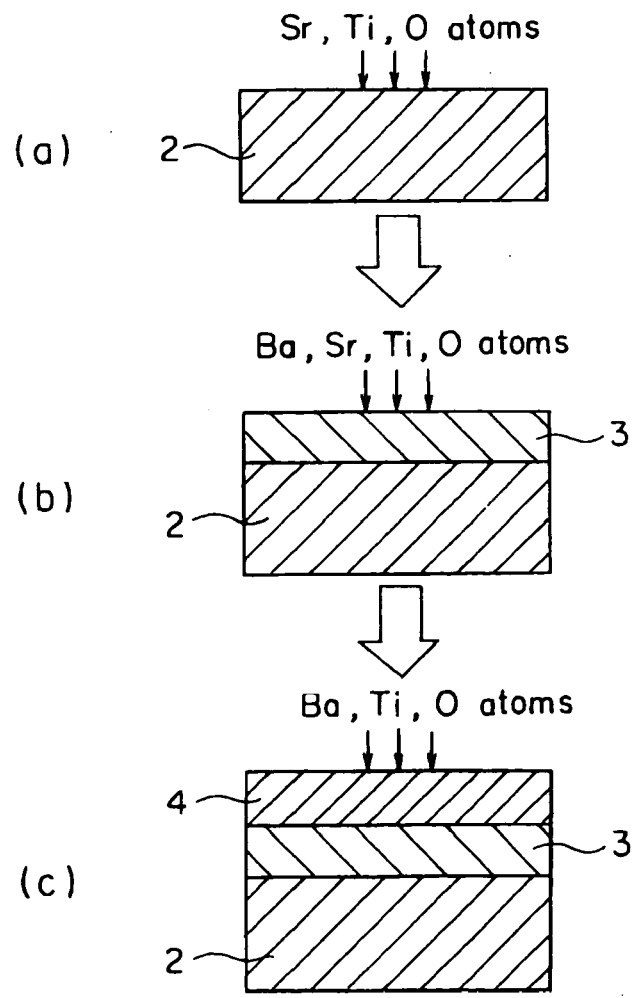
FIG. 2 is a diagram showing a method of manufacturing the substrate of FIG. 1, where (a), (b), and (c) respectively show a first process, a second process, and the last process.

The sintering BTO target was used as the material (see FIG. 2 (c)), and the gaseous mixture of Ar and $O_2$ was used as the sputtering gas.

The above-mentioned single crystal layer of BTO may be set to approximately 100 nm, on which another single crystal layer may be provided further.

If this is the case, the single crystal layer formed last may be grown to a thickness of 1000 nm or more.

In addition, the STO single crystal layer and the BTO single crystal layer may be formed in order on the Si (001) substrate, without interposing the mixed crystal layer 4 of STO and BTO between the STO single crystal layer 3 and the BTO single crystal layer 5.

EXAMPLE 2

Figure 3:
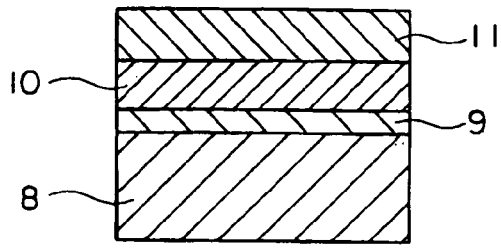
FIG. 3 is a conceptual cross section showing example 2 of the substrate for growing the electro-optical single crystal thin film in accordance with the present invention.

FIG. 3 illustrates a conceptual cross section of the substrate for growing the electro-optical single crystal thin film in accordance with the present example.

This substrate 7 for growing the electro-optical single crystal thin film is for growing the BTO single crystal thin film etc. A carbonization layer 9 with a thickness of approximately 10 nm, a 3C—SiC single crystal layer 10 with a thickness of approximately 500 nm, and an MgO single crystal layer 11 with a thickness of approximately 500 nm are formed, in order on the Si (001) substrate 8, as a buffer layer which buffers lattice mismatch between Si and BTO etc.

In order to manufacture the substrate 7 for growing the above-mentioned electro-optical single crystal thin film, firstly, the Si (001) substrate 8 was heated to a temperature of 1000 degrees C. or more in an $H_2$ (hydrogen gas) atmosphere so as to remove a natural oxide film. Then the substrate temperature was raised to approximately 1150 degrees C., and $C_3H_8$ (propane) was supplied (see FIG. 4(a)), the substrate surface was carbonized, and the carbonization layer 9 (see FIG. 4(b)) with a thickness of approximately 10 nm was formed.

Figure 4:
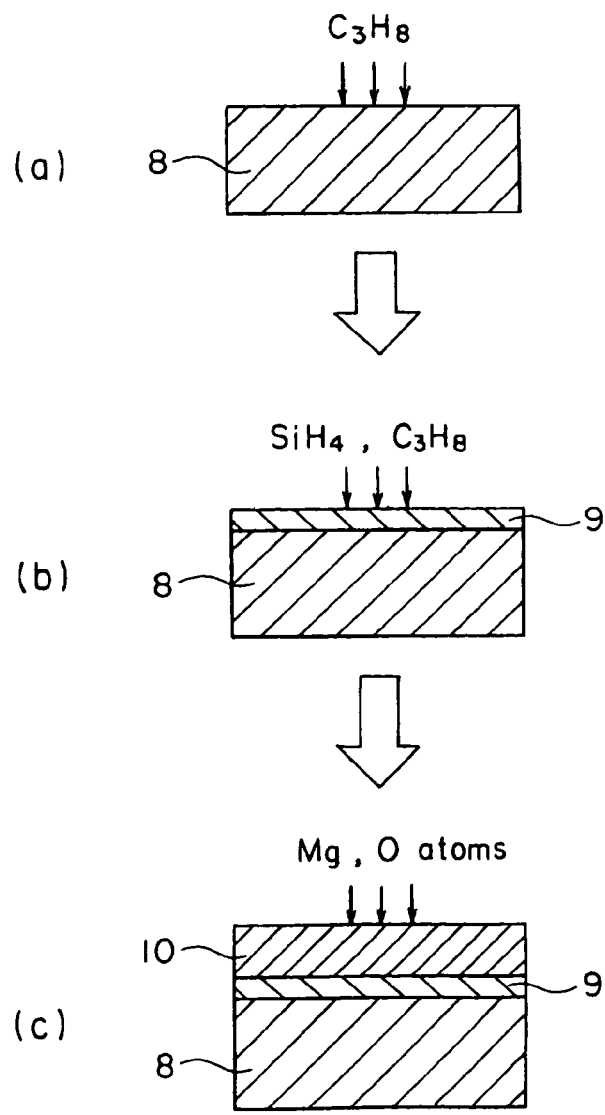
FIG. 4 is a diagram showing a method of manufacturing the substrate of FIG. 3, where (a), (b), and (c) respectively show a first process, a second process, and the last process.

Next, similarly the substrate temperature was held at 1150 degrees C., $SiH_4$ (mono silane) and $C_3H_8$ were supplied (see FIG. 4 (b)), and the 3C—SiC single crystal layer 10 (see FIG. 4(c)) was grown to a thickness of approximately 500 nm.

Then, the Si (001) substrate 8 having formed thereon the carbonization layer 9 and 3C—SiC single crystal layer 10 was provided on an RF sputtering apparatus, the substrate temperature was raised to 600 degrees C., and the MgO single crystal layer 11 (see FIG. 4) was grown to a thickness of approximately 500 nm.

An MgO target was used as the material (see FIG. 4(c)), and the gaseous mixture of Ar and $O_2$ was used as the sputtering gas.

In order to grow a BTO single crystal thin film by using the obtained substrate 7 for growing the electro-optical single crystal thin film, the substrate 7 for growing the electro-optical single crystal thin film was provided on the RF sputtering apparatus, the substrate temperature was raised to 900 degrees C., the gaseous mixture of Ar and $O_2$ was used as the sputtering gas, and the BTO single crystal thin film was grown to a thickness of 1000 nm or more.

EXAMPLE 3

Figure 5:
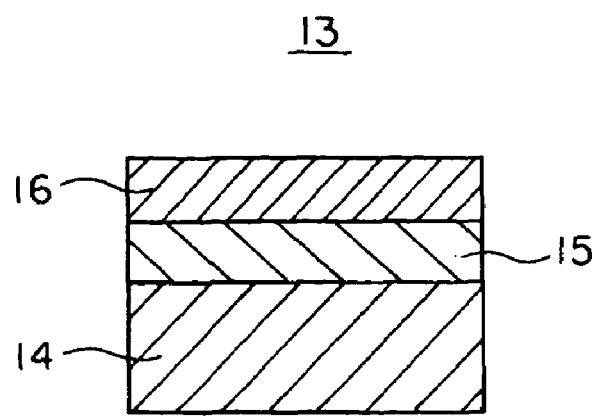
FIG. 5 is a conceptual cross section showing example 3 of the substrate for growing the electro-optical single crystal thin film in accordance with the present invention.

FIG. 5 illustrates a conceptual cross section of the substrate for growing the electro-optical single crystal thin film in accordance with the present example.

This substrate 13 for growing the electro-optical single crystal thin film is for growing the BTO single crystal thin film. An STO single crystal layer 15 with a thickness of approximately 100 nm and a mixed crystal layer 16 of STO and BTO with a thickness of approximately 100 nm are formed, in order on the Si (001) substrate 14, as a buffer layer which buffers the lattice mismatch between Si and BTO.

In order to manufacture the above-mentioned substrate 13 for growing the electro-optical single crystal thin film, as with example 1, firstly the Si (001) substrate 14 was provided on the RF sputtering apparatus so as to form the STO single crystal layer 15 as a film on the natural oxide film, the substrate temperature was raised to 800 degrees C., and the STO single crystal layer 15 (see FIG. 6(b)) was grown to a thickness of approximately 100 nm.

Figure 6:
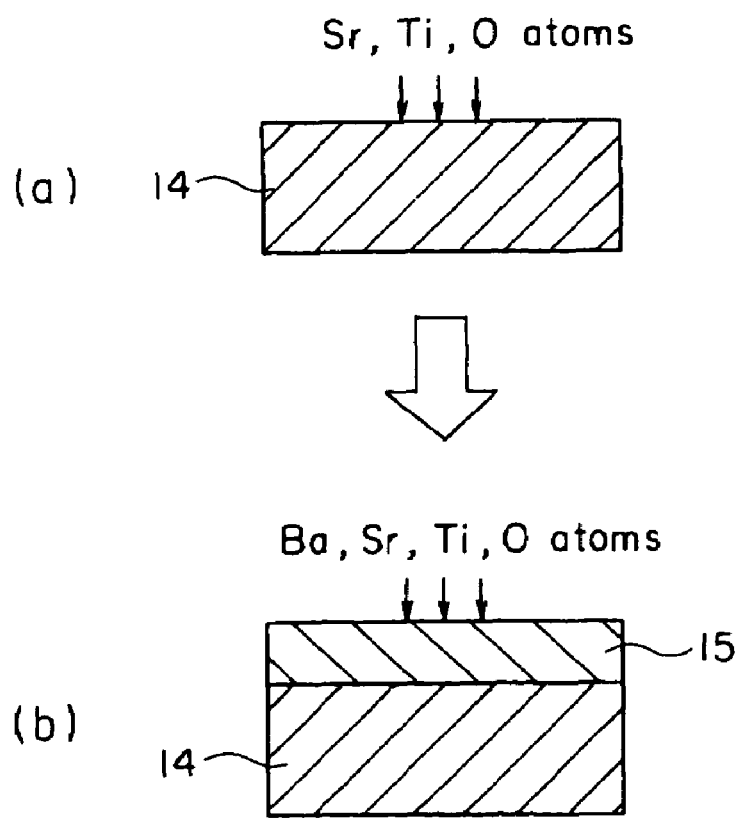
FIG. 6 is a diagram showing a method of manufacturing the substrate of FIG. 5, where (a) shows a first process and (b) shows the last process.

The sintering STO target was used as the material (see FIG. 6 (a)), and the gaseous mixture of Ar and $O_2$ was used as the sputtering gas.

Next, similarly the substrate temperature was held at 800 degrees C., and the mixed crystal layer 16 (see FIG. 5) of STO and BTO was grown to a thickness of approximately 100 nm.

The sintering STO and sintering BTO target was used as the material (see FIG. 6(b)), and the gaseous mixture of Ar and $O_2$ was used as the sputtering gas.

Figure 7:
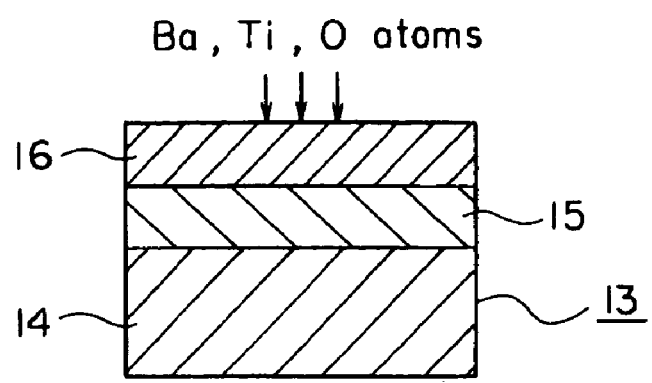
FIG. 7 is a diagram for explaining a method of manufacturing a BTO single crystal thin film using the substrate of FIG. 5.
Figure 8:
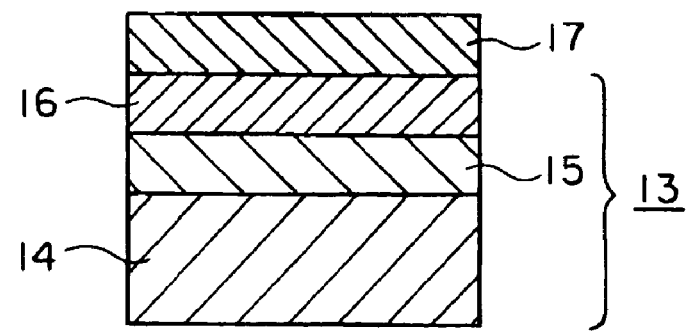
FIG. 8 is a conceptual cross section of the BTO single crystal thin film using the substrate of FIG. 5.

In order to grow a BTO single crystal thin film by using the obtained substrate 13 for growing the electro-optical single crystal thin film, the substrate 13 for growing the electro-optical single crystal thin film was provided on the RF sputtering apparatus, the substrate temperature was raised to 800 degrees C., the sintering BTO target was used as the material (see FIG. 7) as well as the gaseous mixture of Ar and $O_2$ was used as the sputtering gas, and the BTO single crystal thin film 17 (see FIG. 8) was grown to a thickness of 1000 nm or more.

Here, when an XRD evaluation of the BTO single crystal thin film was carried out, nothing was detected except a peak about BTO (001), but it was found to be heteroepitaxial.

This application claims priority from Japanese Patent Application 2004-206150, filed Jul. 13, 2004, which is incorporated herein by reference in its entirety.

What is claimed is:

1. A substrate for epitaxially growing an electro-optical single crystal thin film, wherein two or more layers of buffer layers are formed which buffer lattice mismatch between Si and the electro-optical single crystal thin film on an Si (001) substrate, wherein said buffer layer is constituted by an $SrTiO_3$ (STO) single-crystal layer and a $BaTiO_3$ (BTO) single-crystal layer which are formed in order on the Si (001) substrate.

2. The substrate for growing the electro-optical single crystal thin film according to claim 1, wherein a mixed crystal layer of STO and BTO is interposed between said STO single crystal layer and BTO single crystal layer.

3. The substrate for growing the electro-optical single crystal thin film according to claim 1, wherein said buffer layer is constituted by an STO single crystal layer and a mixed crystal layer of STO and BTO which are formed in order on the Si (001) substrate.

4. The substrate for growing the electro-optical single crystal thin film according to claim 1, wherein said electro-optical single crystal thin film is BTO.

5. A method of manufacturing a substrate for epitaxially growing an electro-optical single crystal thin film, wherein two or more layers of buffer layers which buffer lattice mismatch between Si and the electro-optical single crystal thin film are stacked in order on an Si (001) substrate by way of epitaxial growth,
    wherein said buffer layer is constituted by an $SrTiO_3$ (STO) single crystal layer and a $BaTiO_3$ (BTO) single crystal layer which are stacked in order on the Si (001) substrate by way of epitaxial growth.

6. The method of manufacturing the substrate for growing the electro-optical single crystal thin film according to claim 5, wherein a mixed crystal layer of STO and BTO is stacked on STO single crystal layer by way of epitaxial growth before epitaxially growing said BTO single crystal layer.

7. The method of manufacturing the substrate for growing the electro-optical single crystal thin film according to claim 5, wherein said buffer layer is constituted by an STO single crystal layer and a mixed crystal layer of STO and BTO which are stacked in order on the Si (001) substrate by way of epitaxial growth.

* * * * *